E. J. Marsters,
Cotton Press.

No. 103,907. Patented June 17, 1870.

Witnesses:
A. Bennewendorf
Fro. F. Brooks

Inventor:
E. J. Marsters
per Mmm
Attorneys.

UNITED STATES PATENT OFFICE.

ENOCH J. MARSTERS, OF SHAW'S FLAT, CALIFORNIA.

IMPROVEMENT IN BALING-PRESSES.

Specification forming part of Letters Patent No. 103,907, dated June 7, 1870.

*To all whom it may concern:*

Be it known that I, ENOCH J. MARSTERS, of Shaw's Flat, in the county of Tuolumne and State of California, have invented a new and useful Improvement in Baling-Press; and I do hereby declare that the following is a full, clear, and exact description thereof, which will enable others skilled in the art to make and use the same, reference being had to the accompanying drawing, forming part of this specification, in which—

Figure 2:
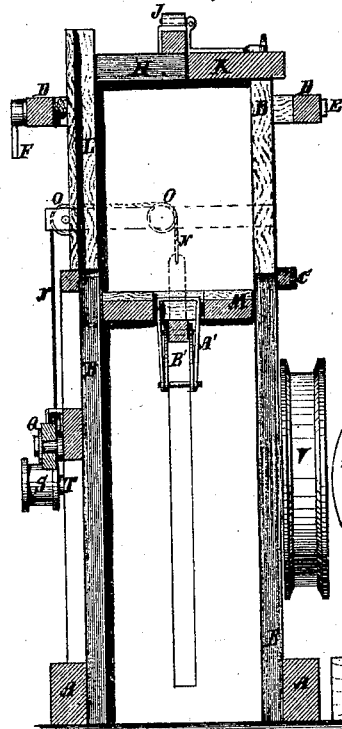
Figure 1:
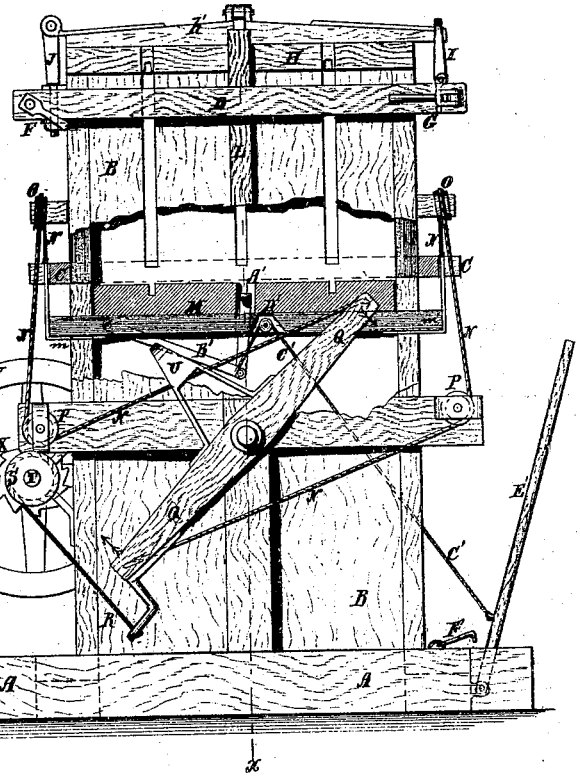
Figure 3:
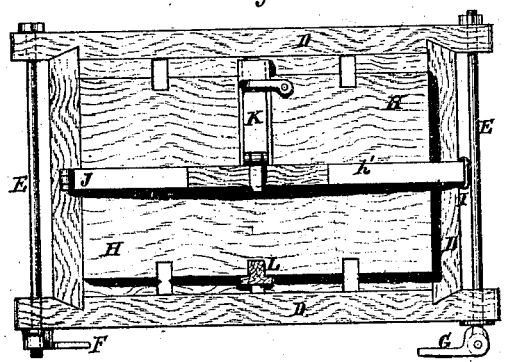

Figure 1 is a side view of my improved press, part being broken away to show the construction. Fig. 2 is a vertical cross-section of the same, taken through the line $x\ x$, Fig. 1. Fig. 3 is a top view of the same.

Similar letters of reference indicate corresponding parts.

My invention has for its object to furnish a simple, convenient, and powerful baling-press for cotton, hay, &c., and which shall be so constructed as to remove the necessity for the heavy side doors now required in presses; and it consists in the construction and combination of various parts of the press, as hereinafter more fully described.

A is the base-frame, to which the lower end of the box B is securely attached.

The box B, at about the lower side of the bale when completely compressed, is supported by a frame, C, strongly framed together and secured to the said box.

The upper end of the box B is supported against the outward pressure by a frame, D, the ends of which are mitered together, as shown in Fig. 3, and which is held together by the cross-rods E, which rods sustain the pressure upon the said frame D.

Upon the ends of the rods E are placed lever-nuts F, or to them are pivoted lever-cams G, so that by loosening the said nuts or cams the frame D, and with it the upper end of the box B, may be expanded by the pressure of the bale, so that the said bale may be conveniently removed.

H is the cover, against which the bale is pressed, and the pressure upon which is sustained by the bar $h'$, one end of which is held by the loop I, passed over its end, said loop being securely hinged or pivoted to the frame D. To the other end of the bar $h'$ is attached one part of the hinge J, the other part of which is swiveled to the frame D, so that the cover H, when released from the loop I, may have a horizontal and vertical movement, to prevent the hinge from being injured by the spring of the cover when released.

The under side of the cover H is grooved to receive the ropes or straps for tying the bale, and when the bale is to be tied upon the top the cover H may be slotted to enable this to be done, said slots being covered by caps K, the inner ends of which are hinged to the bar $h'$, and the other ends of which are secured by buttons, as shown in Fig. 3, as many of these slots and caps being used as the bale is to have bands.

The sides of the upper part of the box B are slotted with as many narrow slots as the bale is to have bands. When the bale is to be tied at the side these slots should be widened to allow the bale to be tied. In this case the said slots are closed by bars L, slid into the slots and resting in notches formed in the inner sides of the side bars of the frame D, as shown in Figs. 1, 2, and 3. When the wide slots are made in the sides the cover need not be slotted, and when the cover is slotted the wide slots need not be made in the sides.

M is the follower, by means of which the bale is forced up against the cover H to compress it, and the upper surface of which is grooved to receive the ropes or straps with which the bale is tied. To the ends of the follower M are attached, or upon them are formed, arms $m'$, to the outer ends of which are attached the ends of the ropes N, which pass over two pulleys, O, or a single large pulley pivoted to the ends of the upper part of the box B. From the pulley or pulleys O the ropes N pass around the pulleys P, pivoted to the outer ends of bars attached to the side of the lower part of the said box B, and the other ends of said ropes are attached to the ends of the equal-armed lever Q, pivoted at its center to the middle of the lower part of the box. To one end of the lever Q is attached one end of the rope R, the other end of which is attached to the drum S, attached to the end of the shaft T, so that as the drum and shaft S T are revolved the rope R will be wound upon the drum S, and the lever Q operated to force the follower M up to compress the bale.

U is an arm attached to the middle part of the lever Q, and across the end of which the rope R passes to bring the said rope into a proper angle with the lever Q to operate it when said lever is in a horizontal position.

By this construction and arrangement it will be observed that the lever Q is operated upon with a constantly-decreasing rapidity of motion, and with a constantly-increasing power as the follower rises and the bale becomes more and more compressed.

The shaft T revolves in bearings attached to the end of the box B, and to the other end of said shaft is attached a large grooved wheel or drum, V, around which the rope is wound to which the horse is attached.

The follower M is held in any position to which it may have been raised by the pawl W, which takes hold of the teeth of the ratchet-wheel X, attached to the shaft T, as shown in Fig. 1.

A' is a plunger, which passes up through a slot in the follower M, and the lower end of which is pivoted to the end of the bar or bars B', the other end of which is pivoted to the follower M, with the bar or bars B' and plunger A'. At or near their point of meeting is connected one end of a rope, C', which passes over a guide-pulley, D', pivoted to the follower M, and the other end of which is attached to the lever E', the lower end of which is pivoted to the base-frame A, so that when the bale has been compressed and tied and the upper part of the box B expanded by operating the lever E', the plunger A' will be forced upward, so that the bale may be easily and conveniently removed from the top of the press when desired.

When not in use, the lever E' may be held up out of the way by a hook, F', as shown in Fig. 1.

Having thus described my invention, I claim as new and desire to secure by Letters Patent—

1. The equal-armed lever Q, ropes N, pulleys O P, and rope R, in combination with the follower M, press-box B, and drum and shaft S T, substantially as herein shown and described, and for the purpose set forth.

2. The combination of the caps K with the slots of the cover H, substantially as herein shown and described, and for the purpose set forth.

3. The swiveled hinge J, in combination with the cover H, box B, and frame D, substantially as herein shown and described, and for the purpose set forth.

4. The combination of the plunger A', pivoted bar or bars B', rope C', guide-pulley D', and pivoted lever E' with the follower M, box B, and base-frame A, substantially as herein shown and described, and for the purpose set forth.

E. J. MARSTERS.

Witnesses:
J. M. LORING,
A. BULLERDIECK.